United States Patent [19]
Martinez

[11] Patent Number: 4,943,603
[45] Date of Patent: * Jul. 24, 1990

[54] REINFORCED POLYMER COMPOSITIONS HAVING EXCELLENT DISTINCTNESS OF IMAGE

[75] Inventor: Eloy C. Martinez, Lake Jackson, Tex.

[73] Assignee: The Dow Chemical Company, Midland, Mich.

[*] Notice: The portion of the term of this patent subsequent to Oct. 3, 2006 has been disclaimed.

[21] Appl. No.: 400,422

[22] Filed: Aug. 30, 1989

Related U.S. Application Data

[63] Continuation of Ser. No. 182,548, Apr. 18, 1988, Pat. No. 4,871,789.

[51] Int. Cl.$^5$ .............................. C08K 7/00; C08K 3/34
[52] U.S. Cl. ..................................... 523/220; 524/451; 524/456; 524/589; 524/590
[58] Field of Search ................ 523/220; 524/589, 590, 524/500, 451, 456

[56] References Cited

U.S. PATENT DOCUMENTS

| | | |
|---|---|---|
| 3,668,177 | 6/1972 | Van Herpt . |
| 4,195,011 | 3/1980 | Gasman et al. . |
| 4,288,563 | 9/1981 | Thorpe . |
| 4,455,398 | 6/1984 | Budich et al. . |
| 4,582,879 | 4/1986 | Frisch et al. . |
| 4,617,330 | 10/1986 | Thai et al. . |
| 4,871,789 | 10/1989 | Martinez ............................ 523/220 |

Primary Examiner—Lewis T. Jacobs

[57] ABSTRACT

Molded polyurethanes are filled with a particular filler mixture, including a certain wollastonite or talc as a supplementary filler, to provide a polymer composition having surprising good physical properties and excellent surface quality.

12 Claims, No Drawings

REINFORCED POLYMER COMPOSITIONS HAVING EXCELLENT DISTINCTNESS OF IMAGE

CROSS-REFERENCE TO RELATED APPLICATION

This is a continuation of application Ser. No. 182,548, filed Apr. 18, 1988, now U.S. Pat. No. 4,871,789.

BACKGROUND OF THE INVENTION

This invention relates to reinforced polymers, more particularly to molded polyurethane and/or polyurea polymers which contain a particulate filler material, which has excellent distinctness of image (DOI).

It is well known to employ various filler materials to modify the physical properties of polymeric materials. The use of such fillers is thoroughly described, for example, in *Handbook of Fillers and Reinforcements for Plastics*, Katz et al., eds., Van Nostrand Reinhold Company, New York, 1978. These fillers usually perform at least one of two major functions. Certain fillers (reinforcing fillers) improve certain desirable physical properties of the polymer, especially tensile strength and flexural modulus (stiffness). These reinforcing fillers typically, although not always, have an aspect ratio significantly greater than one. Examples of these include, fiber glass, milled glass, flaked glass, certain wollastonites, other high aspect ratio minerals polymeric fibers, metallic fibers, and the like. Other fillers are used simply as extenders to reduce the overall cost of the polymer composition. These extenders are typically characterized by their very low cost, and often have an aspect ratio close to one, which causes them to have minimal reinforcing properties. These include kaolin, silica, calcium carbonate, and the like.

In recent years, filled molded polymers, particularly filler polyurethane and/or polyurea polymers have replaced metals in an increasing number of applications. Of particular interest are certain automotive applications, especially automotive exterior body parts. Filled polymers offer several advantages in these applications, particularly their ability to withstand minor impacts, such as encountered in low speed collisions, without damage and the fact that they do not rust. The filled polymers used in making these body parts must exhibit a demanding combination of physical properties. They must have good thermal properties over a wide temperature range, have good dimensional stability, be rigid enough to bear their own weight, yet be flexible enough to withstand minor impact without damage, and be relatively unaffected by extremes in weather conditions. Good success in meeting most of the foregoing criteria has been achieved by using certain reinforced polymers. However, one area in which filled polymers are often lacking is in surface quality. Metals provide a characteristically mirror-like surface after painting. Unfilled polymers often approach or equal the surface qualities of metals, but reinforced or extended polymers usually are significantly inferior in this respect. Because surface appearance is of major importance to the consumer, it is highly desirable to provide a polymeric material having improved surface qualities, and other desirable physical properties.

Similarly, there are other applications wherein excellent surface appearance in a filled polymer is desired. Accordingly, it would be desirable to provide a filled polyurethane and/or polyurea polymer having excellent surface qualities.

SUMMARY OF THE INVENTION

In one aspect, this invention is a filled polymer composition comprising a polyurethane and/or polyurea matrix having dispersed therein a filler mixture comprising (A) a reinforcing filler having particles of an average aspect ratio of at least 4 and an average particle length of at least about 20 $\mu$, except the average particle length is at least about 40 $\mu$ when the reinforcing filler is wollastonite, said reinforcing filler being present in an amount which provides enhanced physical properties to the polymer composition, and (B) a supplementary filler comprising a wollastonite having an aspect ratio of 7 or less and a particle length of about 35 $\mu$ or less or an inorganic compound other than wollastonite having an average aspect ratio of about 4 or less and a median particle size of about 10 $\mu$ or less, in an amount sufficient to measurably improve the surface qualities of the polymer composition relative to the surface qualities of a like polymer composition not containing the supplementary filler.

The use of this combination of fillers surprisingly provides the polymer composition with substantially improved surface qualities, with minimal diminishment of physical properties, compared to a like polymer composition containing only the reinforcing filler.

DETAILED DESCRIPTION OF THE INVENTION

In this invention, a molded polymeric material having good surface qualities is obtained with the use of a specified combination of fillers. One of the fillers, referred to herein as a supplementary filler, is a wollastonite which has an aspect ratio of about 7 or less and a particle length of about 35 $\mu$ or less, or an inorganic compound other than wollastonite having an average aspect ratio of about 4 or less and a median particle size of about 10 $\mu$ or less, or a mixture thereof. The wollastonite preferably has an average particle length of about 1 to abut 35, more preferably about 10 to about 30 $\mu$. The wollastonite also preferably has an aspect ratio (length to diameter ratio) of 1 to about 7, preferably about 3 to about 6. The wollastonite is also preferably surface treated to improve its adhesion to the bulk polymer, as described more fully hereinafter. A particularly preferred wollastonite has an aspect ratio of about 5, an average particle length of about 20–30$\mu$, and is surface treated with an amino-silane or epoxy-silane coupling agent. Such a wollastonite is commercially available under the trade designation Wollastonite 400, available from Interpace Corporation.

The other type of supplementary filler used herein is an inorganic filler having an aspect ratio of less than about 4 and an average particle size of about 10$\mu$ or less, preferably about 5$\mu$ or less, more preferably about 2$\mu$ or less, most preferably about 0.5 to about 2$\mu$. It may or may not be surface treated as described more fully hereinafter. Among the inorganic fillers useful as the supplementary filler are talc, calcium carbonate, feldspar and nepheline syenite, with talc being highly preferred on the basis of performance. Any of the commonly available talc products are useful herein, such as Montana talc, California talc, Vermont talc, New York talc and the like, but those such as Montana talc which contain relatively low levels of impurities are preferred, as indicated by a LOI (loss on ignition) value of 10 or less, more preferably about 5 or less are preferred. Also highly preferred are talc products which have a top particle size of about 20μ or less, more preferably about 10μ or less. Exemplary such talc products include Microtalc MP 12-50, Microtalc MP 15-38, Microtalc CP 10-40, Microtalc CP 14-35, CP 20-30, all available from Pfizer Inc., MPM Division, Desertalc 57, Mikro 507, Mikro 707, all available from Johns-Manville Corp., Emtal 4190 and Emtal 15, both available from Engelhard Minerals & Chemicals Corp., Mistron Frost, Mistron Cyprubond and Mistron Vapor available from Cyprus Industrial Minerals Co., and NYTAL 400, available from R.T. Vanderbilt Company.

The other filler (sometimes referred to herein as the "reinforcing filler") is different than the supplementary filler, and is characterized in having an aspect ratio of at least about 4, more preferably at least about 6, and an average length of at least about 20, more preferably at least about 25, most preferably at least about 40μ. The length of the reinforcing filler is not limited, and continuous filament fibers can be used, but preferably the filler comprises particles having a length up to about 2, more preferably up to about 0.5, most preferably up to about 0.125 inches. If wollastonite is used as the reinforcing filler, it has an average particle length of at least about 40μ. The reinforcing filler preferably is in the form of rod-like or plate-like particles. Suitable such reinforcing fillers include those known to be useful for improving the properties of polymers, such as, for example, wollastonite having an average particle length of at least about 40, milled glass, flaked glass, carbon black, and fibers such as fiber glass, polymeric fibers, particularly polyamide and polyester fibers, metallic fibers, ceramic fibers and the like.

The reinforcing filler is present in an amount sufficient to provide enhanced physical properties to the polymer composition. In general, desirable improvements in physical properties are obtained when the reinforcing filler constitutes at least about 5 weight percent, more preferably at least about 10 weight percent, more preferably at least about 15 weight percent of the polymer, up to about 70 weight percent, preferably up to about 50 weight percent, more preferably up to about 35, and most preferably up to about 30% weight percent of the polymer.

The supplementary filler is present in an amount sufficient to measurably improve the surface quality of the molded polymeric material, as compared to the surface quality of a similar polymeric composition containing the reinforcing filler but not the supplementary filler. In general, surface quality improvements are seen when the supplementary filler comprises at least about 1, preferably at least about 3, more preferably at least about 4 weight percent of the polymer, up to about 20, preferably up to about 15, more preferably up to about 10 weight percent of the polymer. Amounts in excess of these ranges do not appreciably enhance the desired effect, and also contribute to decreases in physical properties.

For the purposes of this invention, surface quality improvements are measured by a distinctness of image test on painted samples using a Dorigon DOI meter model D47-6, as explained more fully hereinafter. An increase of two units on the DOI scale is considered significant for the purposes of this invention.

As mentioned before, it is often advantageous, although not essential, to employ fillers of both types which are "surface treated", i.e. rendered more compatible with the polymer matrix either through chemical modification of the filler itself or by coating the surface of the filler with a material which promotes adhesion to the polymer matrix. Various types of surface treating materials are known, and their use herein will be apparent to those skilled in the relevant art. Suitable surface treating materials include fatty acid salts such as calcium stearate, organic esters of fatty esters, including esters of a fatty acid and an polyhydric alcohol as described in U.S. Pat. No. 4,126,593, incorporated herein be reference: silane coupling agents, including aminochloro-, isocyanto- and epoxy-silane coupling agents, as described, for example, in U. S. Pat. Nos. 4,474,900, 4,582,887, 4,585,850 and 4,607,090, and James R. Steinmetz, "Silanes", Modern Plastics Encyclopedia '88, McGraw-Hill, New York, 1987, all incorporated by reference. Titanate coupling agents, including for example those of the type described in Salvatore J. Monte, "Titanates", Modern Plastics Encyclopedia '88, McGraw-Hill, New York, 1987, incorporated by reference, are also useful herein. Of these surface treating agents, the silanes, particularly the amino-silanes, are preferred on the basis of best performance, availability and economy. Such surface treating agents are advantageously used in a minor amount based on the weight of the filler material, such as from about 0.1 to about 10 weight percent, based on the weight of the filler. The use of surface treatments has been found to somewhat reduce the impact strength of the filler polymer, so it is normally desirable to use the smallest quantity thereof which provides improved bonding of the polymer to the filler.

The polyurethane and or polyurea polymer used herein advantageously is elastomeric, and is characterized in having a plurality of urethane or urea linkages, or mixtures of urethane and urea linkages. This polymer is also advantageously a thermosetting polymer, although thermoplastic polyurethanes are also useful in some applications where thermoplasticity is desired. The polymer is advantageously characterized in having a flexural modulus (filled) of at least 25,000 psi, preferably at least about 35,000, more preferably at least about 50,000 psi, and most preferably about 50,000 to about 300,000 psi. The resulting polymer also preferably noncellular or microcellular, more preferably having a bulk density (filled) of about 0.8 to about 1.6 g/cc, most preferably about 1 to about 1.35 g/cc.

These polyurethanes are advantageously prepared by reacting a relatively high equivalent weight active hydrogen-containing material with a polyisocyanate, usually in the present of a chain extender. The relatively high equivalent weight active hydrogen-containing material is advantageously one as described, for example, in U.S. Pat. No. 4,390,645, incorporated herein by reference. Preferably, it has an equivalent weight of about 700 to about 3000, more preferably about 1000 to about 2500, most preferably about 1000 to about 2200, based on the number of isocyanate-reactive groups, and is a polyether or polyester containing about 1.7 to about 4, preferably about 1.8 to about 3 hydroxyl or primary or secondary amine group/molecule, or mixture of such groups. Preferably, the isocyanate reactive groups are primary hydroxyl or primary or secondary aliphatic amine or primary or secondary aromatic amine, as these are highly reactive as desired for the preferred RIM (reaction injection molding) process. It is also preferred that the relatively high equivalent weight active hydrogen-containing material be a polyether, most preferably a polymer of propylene oxide or mixture thereof with a minor amount of ethylene oxide. Such amine-terminated polyethers and their use in making polyurethanes are described, for example, in U.S. Pat. Nos. 4,444,910 and 4,565,645, and European Patent Publication 81,701. Mixtures of primary hydroxyl-terminated polyether polyols and aminated polyethers are of special interest herein, due to their favorable properties and processing characteristics which make them especially suitable for making molded polyurethane in a RIM process.

Either aliphatic or aromatic polyisocyanates can be used in this invention. Suitable aliphatic polyisocyanates include ethylene diisocyanate, 1,4tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5trimethylcyclohexane, 2,4- and/or 2,6-hexahydrotoluene diisocyanate, perhydro-2,4'- and/or -4,4'-diphenylmethanediisocyanate ($H_{12}MDI$), isophorone diisocyanate, mixtures thereof and the like.

Suitable aromatic polyisocyanates include, for example, 2,4- and or 2,6-toluene diisocyanate (TDI), 2,4' and/or 2,6'-diphenylmethanediisocyanate (MDI), 1,3- and 1,4-phenylene diisocyanate, 1,5-naphthylene diisocyanate, triphenylmethane-4,4',4"-triisocyanate, polyphenylpolymethylene polyisocyanates, and the like.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of about 130–150 are of particular significance.

Of the foregoing polyisocyanates, TDI, MDI, isophorone diisocyanate, $H_{12}MDI$, hexamethylenediisocyanate, cyclohexane diisocyanate and derivatives thereof are preferred due to their cost, commercial availability and performance. TDI, MDI and derivatives of MDI are most preferred. MDI and its derivatives are especially preferred.

The polyisocyanate is used in an amount sufficient to provide an isocyanate index of about 0.6–2, preferably about 0.9–1.25, more preferably about 0.95–1.1. At higher indices, trimerization of the polyisocyanate occurs, causing the polymer to lose flexibility. At lower indices, insufficient curing occurs, causing the polymer to have poor properties. The "isocyanate index" is the ratio of isocyanate groups to active hydrogen-containing groups contained in the mixture which reacts to form the polymer.

Chain extenders are advantageously used to improve the flexural modulus and high temperature properties of the polymer. "Chain extenders", for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol and the like. Amine chain extenders include diethyltoluene diamine and other stearically hindered aromatic diamines as described in U. S. Pat. No. 4,218,510, phenylene diamine, methylene bis(o-chloroaniline), methylene bis(aniline), including NaCl blocked methylene bis(aniline), toluene diamine, aromatic diamines which are substituted at least one of the carbon atoms adjacent to the amine groups with a lower alkyl group, and the like. Diethyltoluene diamine and other stearically hinders aromatic diamines are most preferred due to their reactivity and properties obtained with their use.

Preferred such polymers made using the foregoing isocyanates, high equivalent weight isocyanate-reactive materials and chain extenders polymers are described for example, in U. S. Pat. Nos. 4,374,210, 4,444,910, 4,218,510, 4,296,945, 4,689,356, 4,585.803 and European Patent Publication 81,701, all incorporated herein by reference. In a most preferred embodiment, such polyurethane and/or polyurea polymer is processed in a reaction injection molding (RIM) process. Polyurea polymers as described in U.S. Pat. No. 4,444,910 and polyurethane-polyurea polymers as described in U.S. Pat. No. 4,269,945 are most preferred.

In addition to the components described before, other materials may be used in the preparation of the polyurethane. A catalyst for the reaction of the precursor materials is preferably used in making the polyurethane. Although a wide variety of materials are known to be useful for this purpose, the most widely used and preferred catalysts are the tertiary amine catalysts and the organometallic catalysts. Often the catalyst can be omitted, particularly when polyurea polymers are prepared, as taught in U. S. Pat. No. 4,433,067, incorporated by reference.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the amine-terminated compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of amine-terminated compound.

A blowing agent is optionally employed in this invention, but as stated before, it is preferred that the polymer has a density at least about 0.8 g/cc, so the use thereof herein is preferably limited for this reason. The blowing agent is any material which is capable of generating a gas under the conditions of the reaction of a polyisocyanate and a polyol. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. When density reduction is desired, a preferred method is to incorporate a gas such as air or nitrogen into the isocyanate-reactive components and/or the polyisocyanate component, in a process commonly known as "nucleation".

In addition to the foregoing, other optional additives which are useful herein include surfactants, mold release additives, plasticizers, catalysts, reaction modifiers, pigments, colorants and the like.

In making the filled polymer composition, the fillers are intermixed with the polyurethane and/or polyurea polymer in any convenient manner which provides for a substantially homogeneous dispersion of the fillers. In making thermosetting polyurethane and/or polymers from liquid precursor materials, it is generally convenient to incorporate the fillers into one or more of the precursor materials, although certain fibrous fillers can be placed in the mold before the introduction of the precursor materials are introduced. The precursor is then reacted with the remaining precursor materials to form the filled product. For example the fillers may be incorporated into the polyisocyanate components, or, preferably, into one or more of the isocyanate-reactive components.

Although the particular molding process is not considered critical to this invention, and conventional casting techniques can be used, it is preferred to prepare molded articles according to this invention according to the so-called reaction injection molding technique, in which the isocyanate-reactive materials are mixed under high pressure with the polyisocyanate composition and rapidly injected into the closed mold. This process is suitable for rapidly producing molded parts, and more importantly, permits the handling of the more reactive precursor materials which are preferred in this invention.

The molded article made according to this invention exhibits surprisingly good surface characteristics, compared to a similar article made using the reinforcing filler only. Also surprising is that these surface qualities are obtained with minimal or no loss of other physical properties. Using the distinctness of image (DOI) test set out hereinafter, an improvement of at least 2, preferably at least about 4, more preferably at least about 5 units in DOI is generally obtained with this invention, relative to that of a similar composition containing only the reinforcing filler. Often, improvements of 7 units or more are obtained. Accordingly, DOI measurement of 75 or more, preferably at least about 80 or more, more preferably at least 85 more more, and most preferably about 87 to 90 or even higher are obtained with this invention. Because of these excellent surface properties, the molded compositions of this invention are useful in application which require cosmetically appealing finishes, such as exterior automobile body parts.

Another unexpected advantage of this invention is that the presence of the supplementary filler has been found to improve the processing of the precursor materials. When the supplementary filler is present, fewer mixing worms, flow lines and other indicia of inadequate mixing are seen. Although the invention is not limited to any theory, it is believed that these effects are seen due to a lowering of the viscosity of the reaction mixture. This advantage is of particular significance when it is desired to use relatively high quantities of the primary filler. In the preparation of polyurethanes, particularly by a RIM process, it has been found that the use of filler contents in excess of 20 weight percent leads to particularly poor processing. With this invention, primary filler contents of up to 40 percent or higher can be processed easily to yield a good quality polymer.

Molded automobile body parts according to this invention are particularly useful in preparing outer skins for a door shell useful in conjunction with a cartridge assembly, as described, for example, in the copending applications of McLaren et al, Ser. No. 909,820 and 098,593, filed Sept. 19, 1986 and Sept. 17, 1987, respectively.

The following examples are given to illustrate the invention but are not intended to limit the scope thereof. All parts and percentages are by weight unless otherwise indicated.

EXAMPLE 1

A "B-side" formulation for a polyurethane-urea elastomer having a flexural modulus (unfilled) of about 85,000 is prepared by blending a mixture of about 100 parts relatively high equivalent weight primary amine-terminated polyether and a relatively high equivalent weight primary hydroxyl-terminated polyether, an isomeric mixture of diethyltoluene diamine, an internal mold release agent, and a mixture of amine and organo-tin catalysts. This formulation is reacted with a soft segment MDI prepolymer of the type described in U.S. Pat. No. 4,374,210, having an equivalent weight of 215, at a 1.05 index. In the Examples and Comparative Samples, one or more fillers are incorporated into the B-side formulation before the reaction with the prepolymer, as indicated in Table 1.

The reaction is conducted in a RIM process on a standard RIM machine, wherein the A-side and B-side are injected into the mold at a temperature of 120° F., the mixing pressure is 2000 PSI, the mold temperature is 175° F. and the demold time is 30 seconds. The mold is a flat plaque having a thickness of 0.125". The part is then postcured at 325° F. for one hour. The plaques are cut into 4×12" panels and are washed thoroughly to remove surface impurities and residual mold release agents remaining on the surface. Physical properties of certain of the samples are measured and are reported in Table 1 following. Each of Samples and Comparative Samples are tested for surface quality by a DOI test.

The DOI of the parts is determined by applying a conductive black primer, commercially available as HAP-1724G from PPG Industries, in two passes, each pass followed by flashing off the solvent, so that a total film build of about 0.8 to about 1.1 mils is applied. The primer is cured for 30 minutes at 250° F. A black topcoat, commercially available as Inmont ESB 33J100, is then applied in three passes, each pass followed by flashing off the solvent, so a total film build of 1.5 to 2.0 mils is applied. This topcoat is cured for 17 minutes at 265° F. The DOI is measured using a DORIGON DOI meter model D47-6, with the average of three readings taken at the top, middle and bottom of the sample being reported in Table 2 following.

TABLE 1

| SAMPLE OR COMPARATIVE SAMPLE | FILLER | |
|---|---|---|
| | Type | Amount, %[1] |
| A* | None | — |
| B* | Flaked Glass[2] | 20 |
| C* | Mica[3] | 20.5 |
| D* | Wollastonite[4] | 23 |

TABLE 1-continued

| SAMPLE OR COMPARATIVE SAMPLE | FILLER Type | Amount, %[1] |
|---|---|---|
| 1 | Wollastonite/Talc[5] | 23/7.5 |

[1]Based on the total weight of the polyurethane.
[2]A 1/64" hammer milled glass, available as 737CB from Owens Corning Corporation.
[3]Aphlogopite available as Suzerite 200 from Marietta Resources International, Ltd.
[4]Wollastonite G, available from Interpace Corporation.
[5]Wollastonite G (see note[4]) and Mistron Cyprubond, available from Cyprus Industrial Minerals Co.

The physical properties and DOI measurements for Sample No. 1 and each of the Comparative Samples are as described in Table 2 following. As a further comparison, the DOI for a UNIPRIME steel test panel is also reported.

TABLE 2

| PROPERTY | SAMPLE OR COMPARATIVE SAMPLE | | | | | |
|---|---|---|---|---|---|---|
|  | A* | B* | C* | D* | 1 | Steel |
| Spec. Gravity | 1.06 | 1.25 | 1.27 | 1.30 | 1.31 | — |
| Flex. Mod[1] | 80K | 190K | 200K | 228K | 240K | — |
| Tens. Str[2] | 3500 | 4500 | 3500 | 4500 | 4400 | — |
| Elongation[2] | 180 | 43 | 48 | 65 | 30 | — |
| Izod Impact[3] | 132 | 30 | 35 | 38 | 31 | — |
| Heat Sag, 250°F[4] | 0.065 | 0.19 | 0.10 | 0.17 | 0.15 | — |
| Heat Sag, 325° F.[4] | >2 | 0.50 | 0.40 | 0.40 | 0.50 | — |
| DOI[5] | 96 | 77 | 80 | 84 | 90 | 97 |
| CLTE[6] $\times 10^6$ |  |  |  |  |  |  |
| −40° F. | 80 | 32 | 38 | 22 | 28 | — |
| 150° F. | 85 | 36 | 38 | 28 | 32 |  |
| 250° F. | 88 | 33 | 37 | 30 | 33 |  |

[1]ASTM D-790.
[2]ASTM D-412.
[3]ASTM D-256.
[4]Determined at the stated temperature for 30 minutes with a 6" overhang.
[5]DOI is distinctness of image.
[6]Coefficient of linear thermal expansion. ASTM D-624.

As can be seen from the data presented in Table 2, the filler mixture of this invention provides excellent surface qualities, at minimal sacrifice of physical properties, compared to the other filler polymers evaluated (Comparative Samples B, C and D).

EXAMPLE 2

Following the general procedure described in Example 1, polyurea elastomers having an unfilled flexural modulus of about 95,000 are made by reacting a "B-side" formulation containing a 5000 molecular weight, nominally trifunctional, primary amine-terminated poly(propylene oxide), an isomeric mixture of diethyltoluene diamine, and an internal mold release agent with a prepolymer as described in Example 1, at a 1.05 index. Various fillers are employed, as set out in Table 3 following. The resulting elastomers are evaluated for surface quality using DOI test described before, with results as indicated in Table 3.

TABLE 3

| SAMPLE OR COMPARATIVE SAMPLE | FILLER Type | Amount, %[1] | DOI |
|---|---|---|---|
| E* | None | — | 96 |
| F* | Flaked Glass[2] | 15 | 76 |
| 2 | Flaked Glass/Talc[3] | 15/6 | 81 |
| G* | Wollastonite[4] | 30 | 84 |
| 3 | Wollastonite/Talc[5] | 23/7.5 | 90 |
| 4 | Wollastonite/Talc[5] | 28/7.5 | 90–92 |

[1]Based on the total weight of the polyurethane.
[2]See note[2], Table 1.
[3]Flaked glass according to note[2]. Talc according to note[5], Table 1.
[4]See note[4], Table 1.
[5]See note[5], Table 1.

The use of a filler mixture according to this invention provides substantial improvement in surface qualities, as can be particularly seen by comparing Comparative Sample F with Example 2, and Comparative Sample G with Examples 3 and 4. All examples and Comparative samples have comparable physical properties, except, of course, Comparative Sample E, which is unfilled.

What is claimed is:

1. A filled polymer composition comprising a polyurethane and/or polyurea matrix having dispersed therein a filler mixture comprising
    (A) a reinforcing filler having particles of an average aspect ratio of at least 4 and an average particle length of at least about 20μ, except the average particle length is at least about 40μ when the reinforcing filler is wollastonite, and
    (b) a supplementary filler comprising a wollastonite having an aspect ratio of 7 or less and a particle length of about 35μ or less or an inorganic compound other than wollastonite having an average aspect ratio of about 4 or less and a median particle size of about 10μ or less wherein the composition contains from about 5 to about 50 weight percent of said reinforcing filler, and about 1 to about 20 weight percent of said supplementary filler, based on the weight of the polyurethane and/or polyurea matrix.

2. The polymer composition of claim 1 wherein said reinforcing filler is selected from the group consisting of wollastonite having an average particle size of at least 40μ, milled glass, flake glass, fiber glass, and polymeric fibers, and said supplementary filler is wollastonite having an average aspect ratio of about 3 to about 6 or less and a particle length of about 10 to about 30μ, or talc having an average particle size from about 0.5 to about 2μ.

3. The polymer composition of claim 2 wherein said polyurethane and/or polyurea is a reaction product of precursor materials comprising an aromatic polyisocyanate, an aromatic diamine chain extender, and a relatively high equivalent weight isocyanate-reactive material which is a primary hydroxyl-, primary amine-or secondary amine-terminated polyether having an average functionality of about 1.8 to about 4 and an equivalent weight from about 1000 to about 2500.

4. The polymer composition of claim 3 wherein the reinforcing filler is wollastonite having an average particle size of at least 40μ and the supplementary filler is talc.

5. The polymer composition of claim 4 which has a density of at least 0.8 g/cc.

6. The polymer composition of claim 5 which is prepared in a reaction injection molding process.

7. The polymer composition of claim 6 wherein said relatively high equivalent weight isocyanate-reactive material comprises a mixture of a primary amine terminated polyether and a primary hydroxyl-terminated polyether.

8. The polymer composition of claim 6 wherein said relatively high equivalent weight isocyanate-reactive material comprises a polyether having at least about 50% of its active hydrogen-containing groups in the form of primary amine groups.

9. An exterior automobile body part prepared by molding the polymer composition of claim 1.

10. An exterior automobile body part prepared by molding the polymer composition of claim 3.

11. An exterior automobile body part prepared by molding the polymer composition of claim 7.

12. An exterior automobile body part prepared by molding the polymer composition of claim 8.

* * * * *